United States Patent
Lee et al.

(10) Patent No.: US 9,914,877 B2
(45) Date of Patent: Mar. 13, 2018

(54) LIQUID CRYSTAL MEDIUM AND LIQUID CRYSTAL DISPLAY

(75) Inventors: Eun-Kyu Lee, Daejeon (KR); Seung-Eun Lee, Seoul (KR); Dong-Mee Song, Hwaseong (KR)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 13/991,764

(22) PCT Filed: Oct. 31, 2011

(86) PCT No.: PCT/EP2011/005503
§ 371 (c)(1),
(2), (4) Date: Jun. 5, 2013

(87) PCT Pub. No.: WO2012/076086
PCT Pub. Date: Jun. 14, 2012

(65) Prior Publication Data
US 2013/0258071 A1    Oct. 3, 2013

(30) Foreign Application Priority Data
Dec. 7, 2010 (EP) ..................... 10015362

(51) Int. Cl.
C09K 19/30 (2006.01)
C09K 19/44 (2006.01)
C09K 19/54 (2006.01)
C09K 19/04 (2006.01)
C09K 19/12 (2006.01)

(52) U.S. Cl.
CPC .......... *C09K 19/3003* (2013.01); *C09K 19/44* (2013.01); *C09K 19/54* (2013.01); *C09K 2019/0448* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3027* (2013.01); *C09K 2019/548* (2013.01)

(58) Field of Classification Search
CPC .............................. C09K 19/3003; C09K 19/44
USPC ............. 252/299.01, 299.5, 299.63, 299.66; 428/1.1
See application file for complete search history.

(56) References Cited

U.S. PATENT DOCUMENTS

| 7,351,453 | B2 | 4/2008 | Ichinose |
| 7,425,355 | B2 | 9/2008 | Klasen-Memmer et al. |
| 7,731,865 | B2 | 6/2010 | Bernatz |
| 8,114,310 | B2 | 2/2012 | Bernatz |
| 8,168,081 | B2 | 5/2012 | Klasen-Memmer et al. |
| 8,399,073 | B2 * | 3/2013 | Klasen-Memmer ........... C09K 19/3001 252/299.61 |
| 2006/0115606 | A1 | 6/2006 | Ichinose et al. |
| 2006/0263544 | A1 | 11/2006 | Klasen-Memmer et al. |
| 2008/0117379 | A1 | 5/2008 | Kim et al. |
| 2008/0273160 | A1 | 11/2008 | Kim et al. |
| 2009/0103011 | A1 | 4/2009 | Bernatz et al. |
| 2009/0309066 | A1 * | 12/2009 | Klasen-Memmer et al. ........... 252/299.61 |
| 2009/0324853 | A1 | 12/2009 | Bernatz et al. |
| 2010/0134751 | A1 * | 6/2010 | Klasen-Memmer et al. ........... 349/182 |
| 2010/0272925 | A1 * | 10/2010 | Goetz et al. ........... 428/1.1 |
| 2011/0248216 | A1 * | 10/2011 | Klasen-Memmer ........... C09K 19/3001 252/299.62 |

FOREIGN PATENT DOCUMENTS

| EP | 2053113 A1 | 4/2009 | |
| JP | 2006169518 A | 6/2006 | |
| JP | 2006328395 A | 12/2006 | |
| JP | 2009102639 A | 5/2009 | |
| JP | 2010503733 A | 2/2010 | |
| KR | 2006-0120455 A | 11/2006 | |
| KR | 2009-0031781 A | 3/2009 | |
| WO | WO 2010072370 A1 * | 7/2010 | ......... C09K 19/3001 |

OTHER PUBLICATIONS

International Search Report for PCT/EP2011/005503 (dated Jan. 16, 2012).
Translation summary of JP Appln. No. 2013-542384 Office Action dated Jun. 30, 2015.
D. Pauluth et al., "Advanced liquid crystals for television", J. Mater. Chem., 2004, 14, pp. 1219-1227.
Y. Gotoh et al., "Innovation in liquid crystal material development and prospects for the future", Proceedings 2009 Japanese Liquid Crystal Society annual meeting Session ID: 2a07—Retrieved from http://doi.org/10.11538/ekitou.2009.0.40.0 on Oct. 5, 2016.
Bibliographic Data—English Abstract of KR 2009-0031781—Publication Date: Mar. 27, 2009.
Bibliographic Data—English Abstract of KR 2006-0120455—Publication Data: Nov. 27, 2006.
English Translation of Notice Of Preliminary Rejection corresponding to Korean Patent Application No. 2013-7017579—dated Dec. 6, 2017.

* cited by examiner

*Primary Examiner* — Mark F Huff
*Assistant Examiner* — Anna Malloy
(74) *Attorney, Agent, or Firm* — Millen White Zelano and Branigan, PC; John Sopp; Csaba Henter

(57) ABSTRACT

The present invention relates to a liquid crystal panel, a liquid crystal display device and to a liquid crystal medium having a negative dielectric anisotropy $\Delta\varepsilon$.

34 Claims, No Drawings

LIQUID CRYSTAL MEDIUM AND LIQUID CRYSTAL DISPLAY

The present invention relates to a liquid crystal medium having a negative dielectric anisotropy $\Delta\varepsilon$ and a liquid crystal display comprising that medium.

There is a great demand for LCDs (liquid crystal displays), in particular of the matrix type, that have very high specific resistance at the same time as a large working-temperature range, short response times even at low temperatures and a low threshold voltage. In particular, LC media for VA (vertically aligned) and, in particular for PS (polymer stabilized) VA, nematic display cells are required which facilitate the following advantages in the cells:
- extended nematic phase range (in particular down to low temperatures),
- the ability to switch at very low temperatures (e.g. for outdoor use, auto-mobile, avionics),
- increased resistance to UV radiation (longer service life) and
- fast switching for TV-applications, especially for 3D TV-applications.

For VA displays, LC media are desired which enable lower threshold voltages and broader nematic phase ranges, in particular at low temperatures. A further widening of the available parameter latitude (clearing point, smectic-nematic transition or melting point, viscosity, dielectric parameters, elastic parameters) is also desired. Also, the LC media should have favourable values of ratio of the elastic constants $k_{33}/k_{11}$.

For TV, mobile phone and monitor applications, LC media are desired which have a fast response time and a low threshold voltage, furthermore a good LTS (low temperature stability). Also, depending on the thickness of the switchable LC layer, a moderate or high birefringence may be required.

However, the LC media known in prior art have the disadvantage that they often do not allow all these requirements to be achieved simultaneously, without negatively affecting the other parameters of the LC cell.

The present invention has the aim of providing LC media, in particular for active matrix displays like those of the TFT (thin film transistor) type, and generally for VA displays, which do not have the above-mentioned disadvantages or only do so to a reduced extent, and preferably simultaneously have a very high specific resistance, a low threshold voltages, a low rotational viscosity, a broad nematic phase range with high clearing point, an improved LTS and fast switching times. Another aim is to extend the pool of LC media available to the expert. Other aims are immediately evident from the following description.

It has been found that these aims can be achieved if an LC medium according to the present invention is used in LC panels and LC displays according to the present invention.

The liquid crystalline media according to the present invention are particularly well suited for application in 3D TV. This holds especially for the systems after stabilization by polymerization of the polymer precursor.

Thus, the present invention relates to a LC panel and a LC display device containing the following LC medium comprising
- 9 to 24% of one or more compounds of formula I,
- 9 to 14% of one or more compounds of formula II,
- 11 to 21% of one or more compounds of formula III,
- 10 to 22% of one or more compounds of formula IV,
- 16 to 44% of one or more compounds of formula V,
- 0 to 19% of one or more compounds of formula VI and
- 0 to 8% of one or more compounds of the formula VII

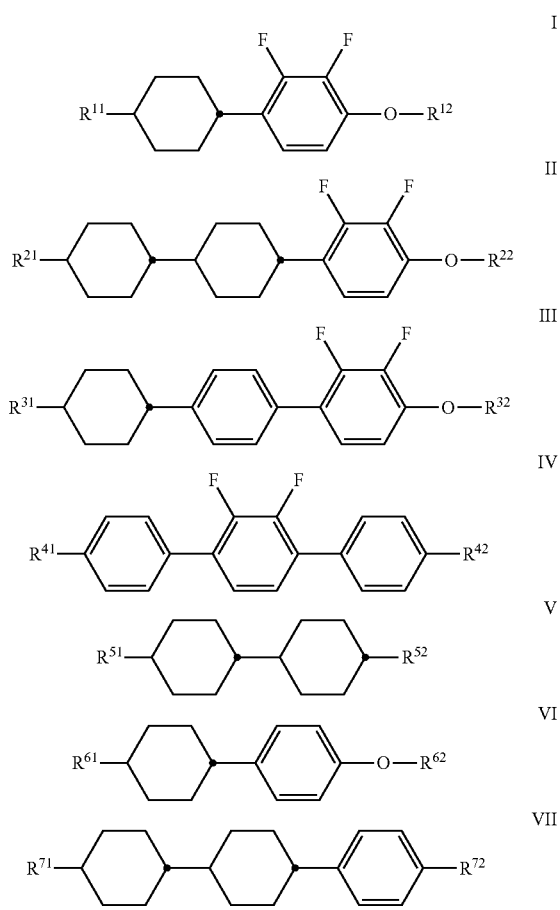

in which
$R^{11}$, $R^{21}$, $R^{31}$, $R^{41}$, $R^{51}$, $R^{61}$ and $R^{71}$
  are independently of each other straight-chain alkyl with 1 to 5 carbon atoms, preferably with 2 to 5 carbon atoms, and most preferably ethyl, propyl or pentyl,
$R^{12}$, $R^{22}$, $R^{32}$, $R^{42}$, $R^{52}$, $R^{62}$ and $R^{72}$
  are independently of each other straight-chain alkyl with 1 to 6 carbon atoms, preferably with 1 to 4 carbon atoms, preferably methyl, ethyl, propyl or butyl, and
$R^{52}$ alternatively may be alkenyl with 2 to 5 carbon atoms, preferably E-1-alkenyl, most preferably vinyl or E-1-propenyl,
preferably each independently of each other
$R^{11}$ and $R^{21}$ are propyl or pentyl,
$R^{12}$ and $R^{22}$ are ethyl or butyl,
$R^{31}$ and $R^{41}$ are ethyl or propyl,
$R^{32}$ is ethyl,
$R^{42}$ is propyl or butyl,
$R^{51}$ is ethyl or propyl,
$R^{52}$ is propyl, vinyl or E-1-propenyl,
$R^{61}$ and $R^{71}$ are propyl,
$R^{62}$ and $R^{72}$ are methyl.

In a preferred embodiment the liquid crystal medium essentially consists of the compounds of the aforementioned formulae I to VII.

Especially preferred is a LC medium comprising one or more compounds selected from the group of the following compounds:

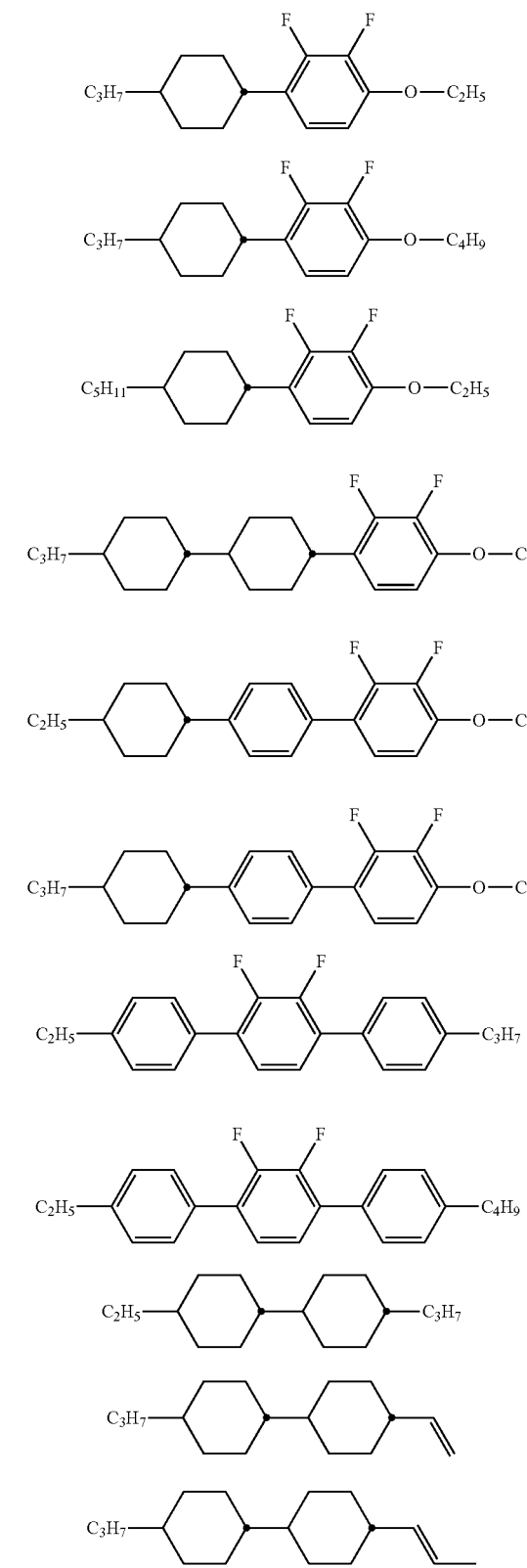

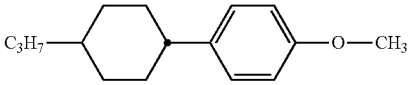

In an especially preferred embodiment the liquid crystal medium essentially consists of the compounds of the aforementioned formulae Ia to VIIa.

In a preferred embodiment the liquid crystal medium comprises
  8 to 12% of a compound of the formula Ia,
  3 to 7% of a compound of the formula Ib,
  10 to 14% of a compound of the formula IIa,
  5 to 9% of a compound of the formula IIIa,
  9 to 12% of a compound of the formula IIIb,
  12 to 16% of a compound of the formula IVa,
  16 to 21% of a compound of the formula Va,
  15 to 19% of a compound of the formula VIa and
  4 to 8% of a compound of the formula VIIIa.

In a preferred embodiment, the LC medium consists exclusively of the above-mentioned compounds.

In another, second preferred embodiment the liquid crystal medium comprises
  6 to 8% of a compound of the formula Ia,
  3 to 7% of a compound of the formula Ib,
  10 to 14% of a compound of the formula IIa,
  2 to 6% of a compound of the formula IIIa,
  9 to 12% of a compound of the formula IIIb,
  12 to 16% of a compound of the formula IVa,
  2 to 6% of a compound of the formula IVb,
  18 to 24% of a compound of the formula Va,
  13 to 17% of a compound of the formula VIa and
  2 to 5% of a compound of the formula VIIIa.

In a preferred embodiment, the LC medium consists exclusively of the above-mentioned compounds.

In still another, third preferred a preferred embodiment the liquid crystal medium comprises
  13 to 17% of a compound of the formula Ia,
  3 to 7% of a compound of the formula Ic,
  9 to 13% of a compound of the formula IIa,
  4 to 7% of a compound of the formula IIIa,
  8 to 13% of a compound of the formula IIIb,
  10 to 17% of a compound of the formula IVa,
  27 to 33% of a compound of the formula Vb and
  8 to 11% of a compound of the formula Vc.

In a preferred embodiment, the LC medium consists exclusively of the above-mentioned compounds.

Alternatively, in any of the above preferred embodiments, the LC medium comprises a reactive compound, preferably of the type RM-1 and/or RM-2, as defined below, preferably in a concentration in the range from 0.010 to 1.0%, more preferably in the range from 0.05% to 0.50% and most preferably in the range from 0.10% to 0.40%. Preferably this reactive compound is polymerized in the liquid crystal medium in the display.

The LC media according to the present invention are characterized by
  a broad nematic phase with a very high clearing point,
  a low viscosity,
  good LTS (low temperature stability), a low threshold voltage, high UV stability, a suitably high absolute value for the negative dielectric anisotropy $\Delta\epsilon$, a suitably high value for the optical anisotropy $\Delta n$.

In the pure state, the compounds of the formulae I-IX are colourless and form liquid crystal mesophases in a temperature range which is favourably located for electro-optical use. They are stable chemically, thermally and to light.

The compounds of the formulae I to VII are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants which are known per se, but are not mentioned here in greater detail.

The invention also relates to electro-optical displays and panels which contain LC media according to at least one of claims 1 to 13, and to the use of these LC media for electro-optical purposes. Very preferred are LC panels comprising an LC medium sandwiched by a pair of substrates; and electrodes for applying an electric field to the LC medium perpendicular to the surfaces of the substrate, the liquid crystal medium being vertically aligned with respect to the substrate surface at the time when no electric field is applied.

The LC mixtures according to the invention enable a significant widening of the available parameter latitude. Especially, it was found that they have a fast switching time, low threshold voltage, good LTS, high specific resistance, high UV stability and high HR (voltage (respectively capacitace) holding ratio) [as defined in S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)]. Also, the achievable combinations of clearing point, rotational viscosity $\gamma_1$, low $\Delta n$ and suitably high absolute value of the negative dielectric anisotropy are distinctively superior to materials known from prior art.

The LC media, which can be used in accordance with the invention, are prepared in a manner conventional per se. In general, the desired amount of the components used in the lesser amount is dissolved in the components making up the principal constituent, advantageously at elevated temperature.

The LC media may also comprise further additives known to the person skilled in the art and described in the literature. For example, 0-15% of one or more additives selected from the group of pleochroic dyes, stabilizers, for example UV stabilizers, antioxidants, chiral dopants, reactive mesogens with or without polymerization initiators, microparticles and/or nanoparticles, can be added to the liquid crystal medium according to this invention. Suitable chiral dopants, stabilizers and reactive mesogens are shown in Tables B, C and D, respectively.

In the present application and in the examples below, the structures of the components of the LC media are indicated by the following acronyms.

Particular preference is given to liquid-crystal mixtures which comprise compounds selected from the following table:

TABLE A

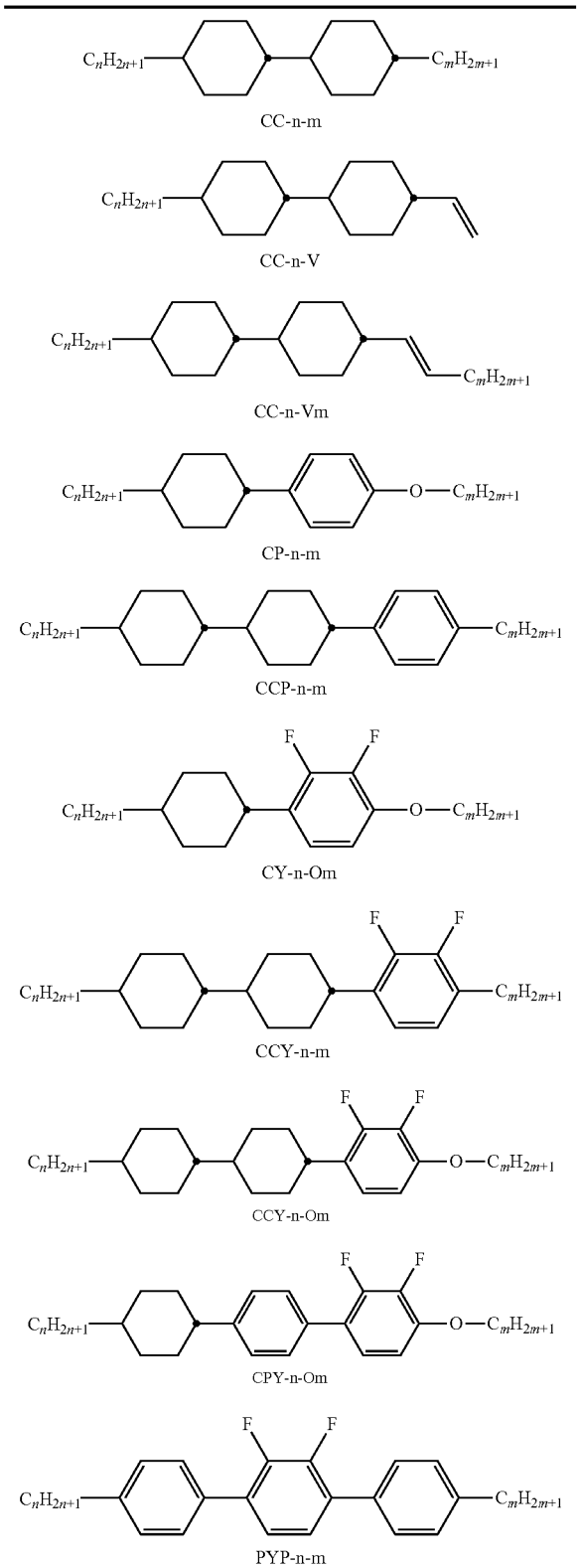

(n and m: each independently from each other are 1, 2, 3, 4 or 5)

Table B shows chiral dopants that can beneficially be added to the LC medium according to the present invention, preferably in amounts of from 0.1 to 10 wt. %, very preferably from 0.1 to 6 wt. %.

TABLE B
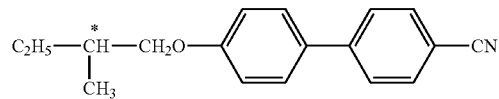
C 15
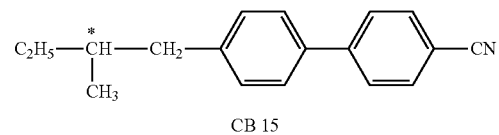
CB 15
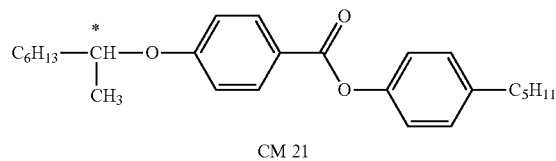
CM 21
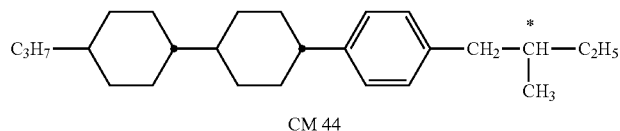
CM 44
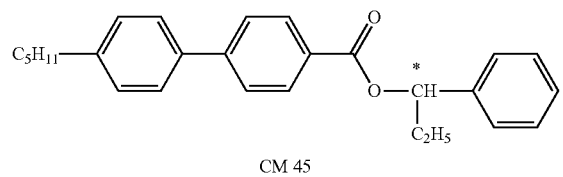
CM 45
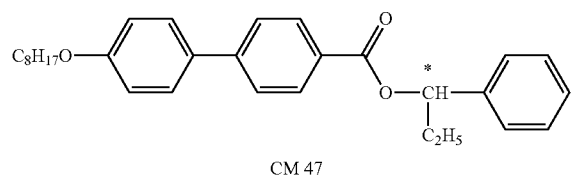
CM 47
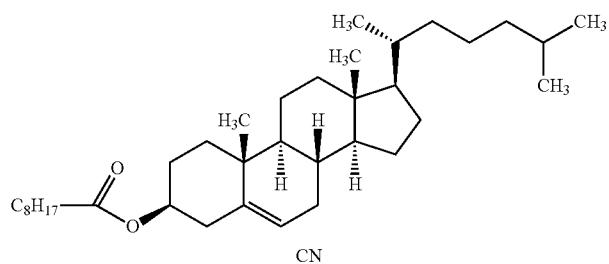
CN
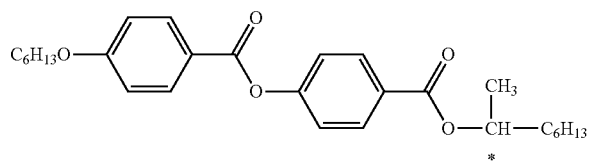
R/S-811

TABLE B-continued
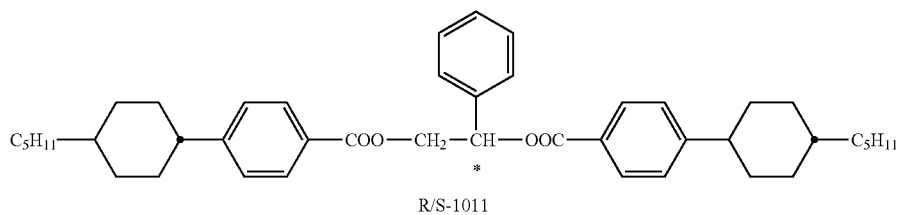
R/S-1011
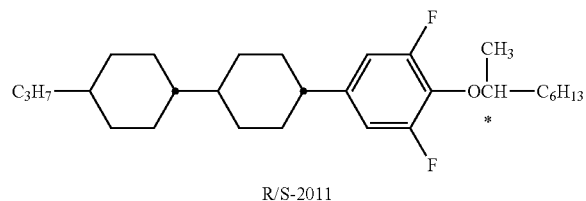
R/S-2011
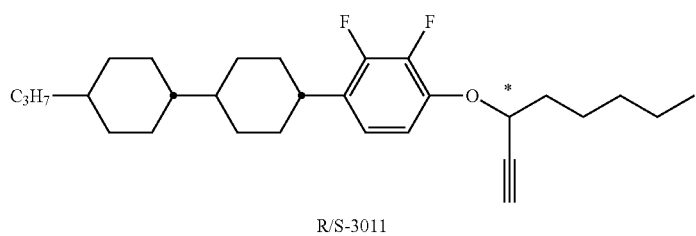
R/S-3011
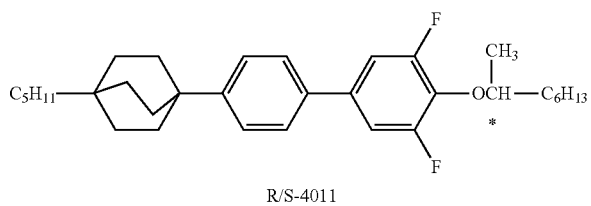
R/S-4011
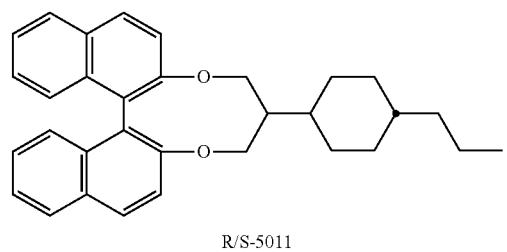
R/S-5011
The following table shows possible stabilizers that can be added to the LC media according to the present invention.
TABLE C
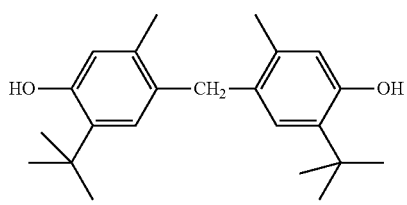 [SMILES: Cc1cc(O)c(C(C)(C)C)cc1Cc1cc(C(C)(C)C)c(O)cc1C]

TABLE C-continued
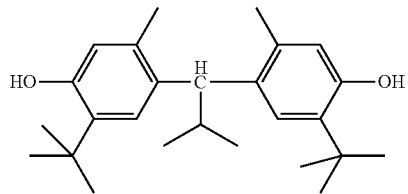 [SMILES: Cc1cc(O)c(C(C)(C)C)cc1C(c1cc(C(C)(C)C)c(O)cc1C)C(C)C]
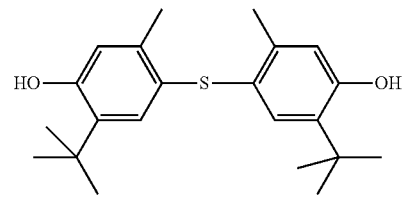 [SMILES: Cc1cc(O)c(C(C)(C)C)cc1Sc1cc(C(C)(C)C)c(O)cc1C]
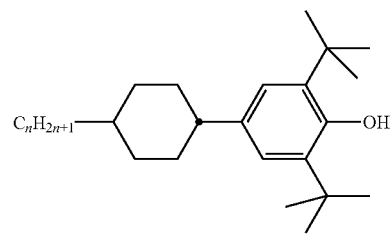
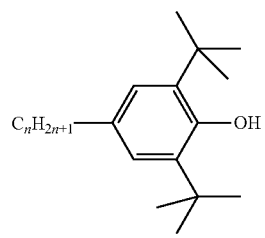
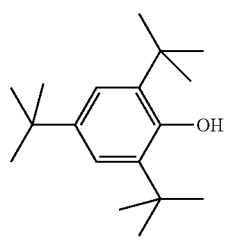 [SMILES: CC(C)(C)c1cc(C(C)(C)C)c(O)c(C(C)(C)C)c1]
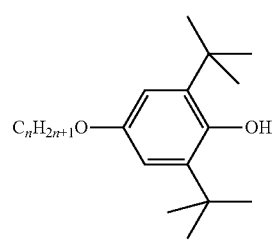
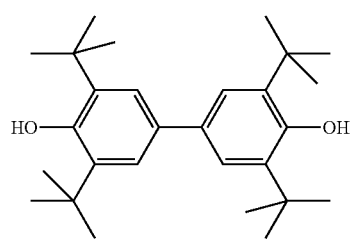 [SMILES: CC(C)(C)c1cc(-c2cc(C(C)(C)C)c(O)c(C(C)(C)C)c2)cc(C(C)(C)C)c1O]

TABLE C-continued
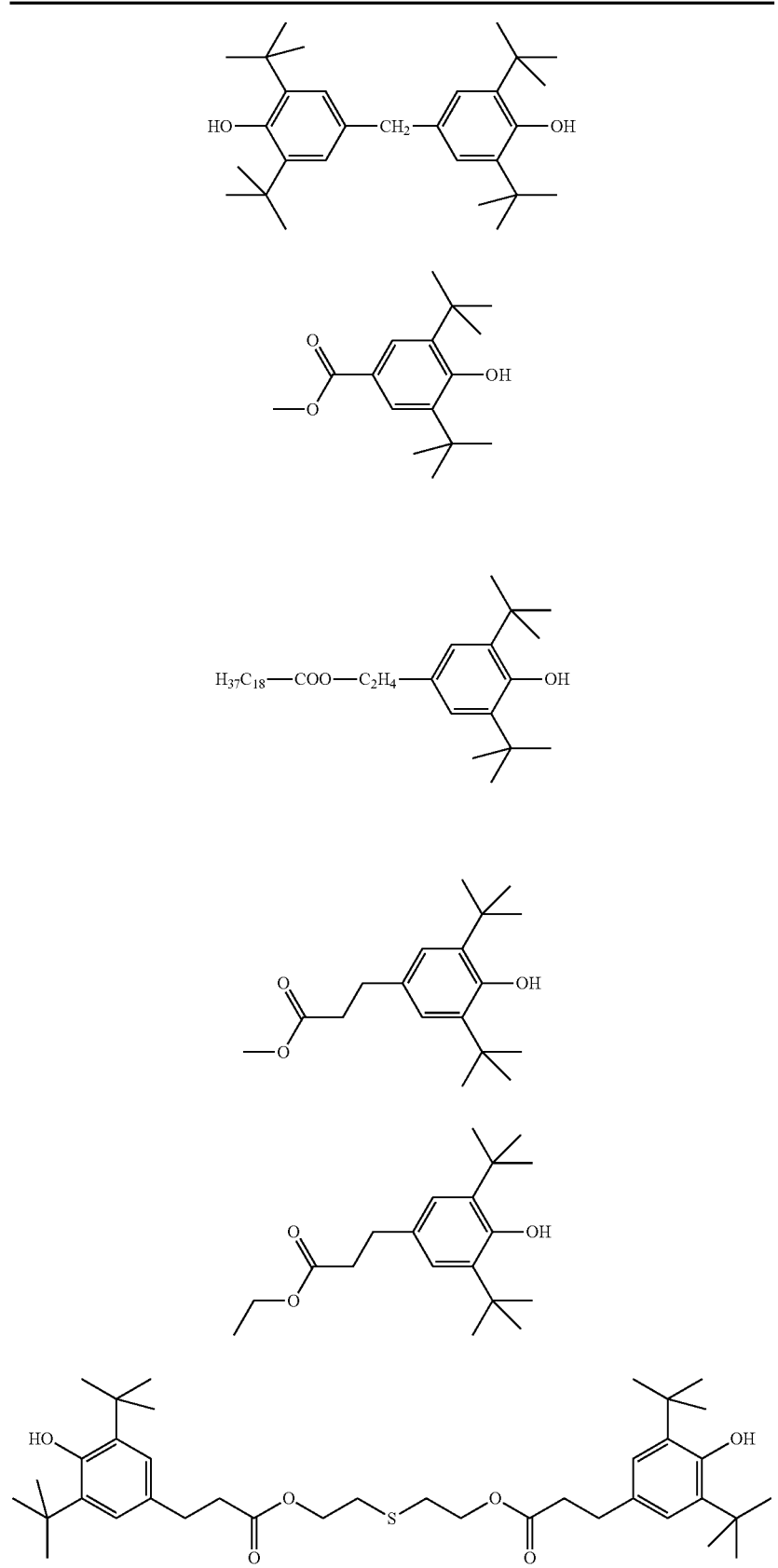

TABLE C-continued
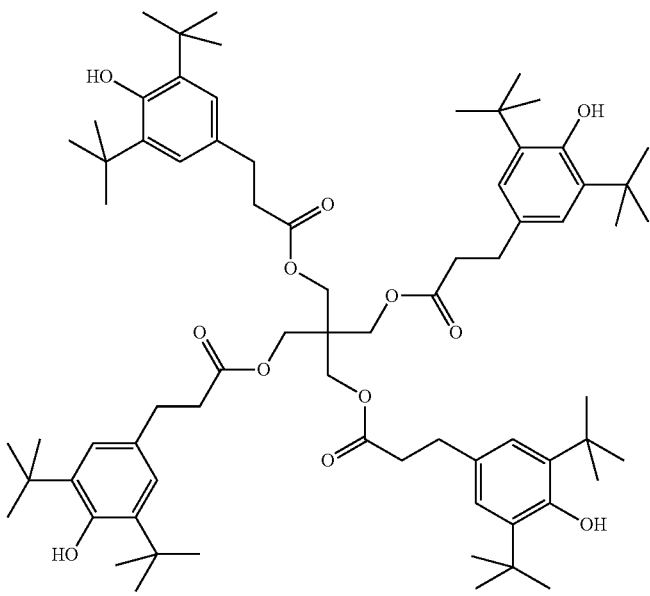 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
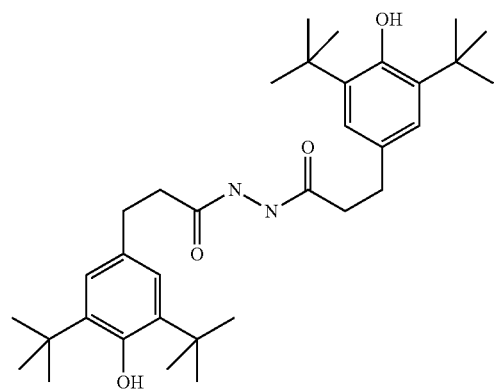 [SMILES: CC(C)(C)c1cc(CCC(=O)NNC(=O)CCc2cc(C(C)(C)C)c(O)c(C(C)(C)C)c2)cc(C(C)(C)C)c1O]
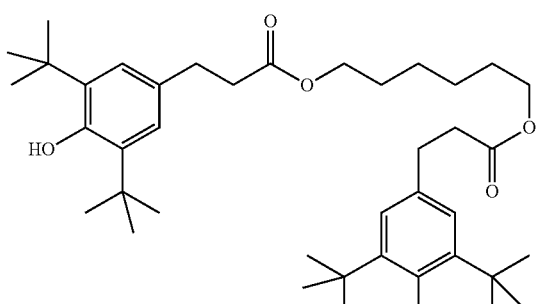
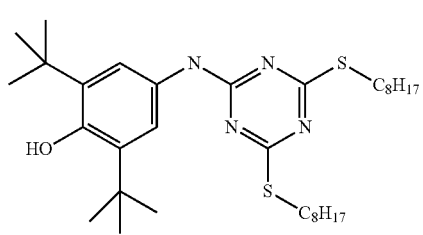

TABLE C-continued
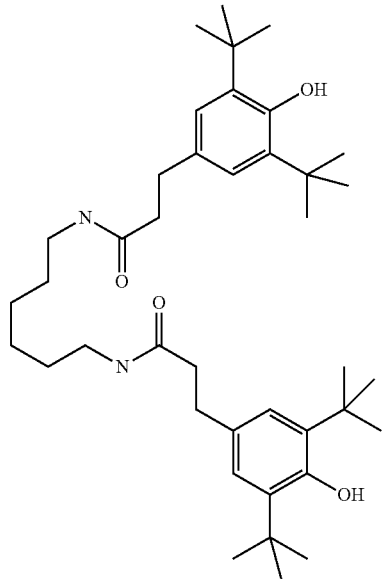 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
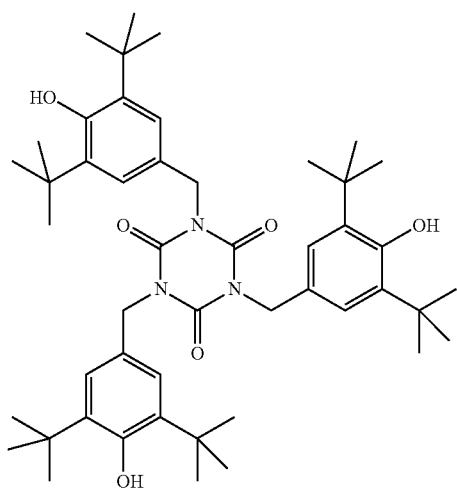 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
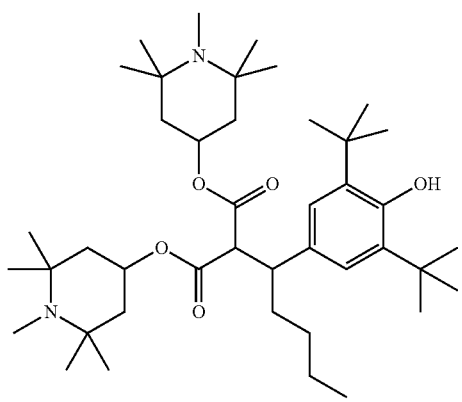 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]

TABLE C-continued
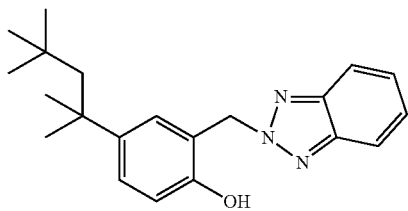 [SMILES: CC(C)(C)CC(C)(C)c1ccc(O)c(Cn2nc3ccccc3n2)c1]
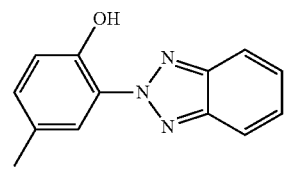 [SMILES: Cc1ccc(O)c(-n2nc3ccccc3n2)c1]
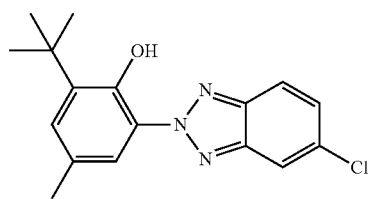 [SMILES: Cc1cc(-n2nc3ccc(Cl)cc3n2)c(O)c(C(C)(C)C)c1]
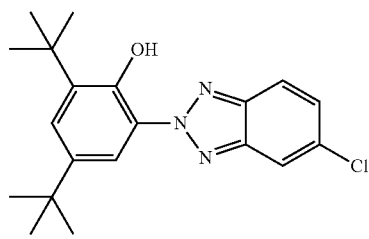 [SMILES: CC(C)(C)c1cc(-n2nc3ccc(Cl)cc3n2)c(O)c(C(C)(C)C)c1]
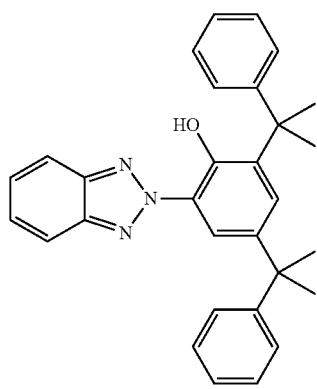 [SMILES: CC(C)(c1ccccc1)c1cc(-n2nc3ccccc3n2)c(O)c(C(C)(C)c2ccccc2)c1]
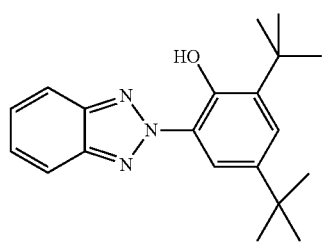 [SMILES: CC(C)(C)c1cc(-n2nc3ccccc3n2)c(O)c(C(C)(C)C)c1]

TABLE C-continued
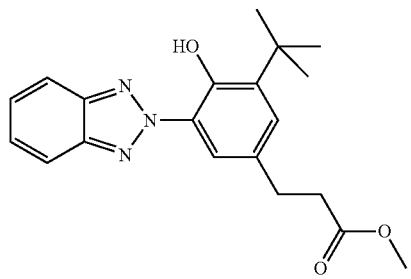 [SMILES: COC(=O)CCc1cc(-n2nc3ccccc3n2)c(O)c(C(C)(C)C)c1]
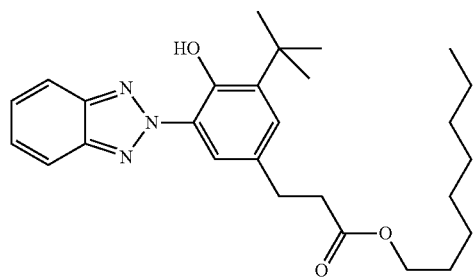 [SMILES: CCCCCCCCOC(=O)CCc1cc(-n2nc3ccccc3n2)c(O)c(C(C)(C)C)c1]
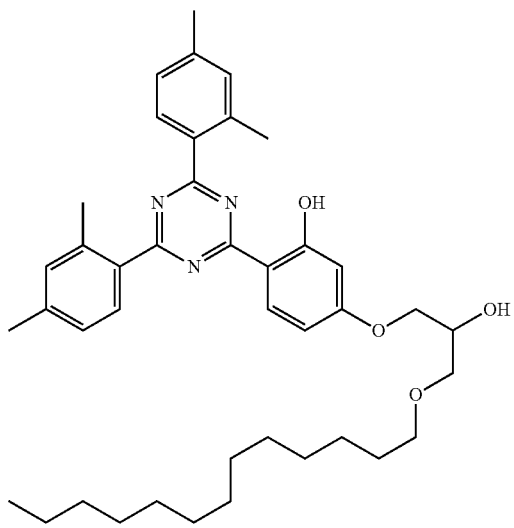 [SMILES: CCCCCCCCCCCCCOCC(O)COc1ccc(-c2nc(-c3ccc(C)cc3C)nc(-c3ccc(C)cc3C)n2)c(O)c1]
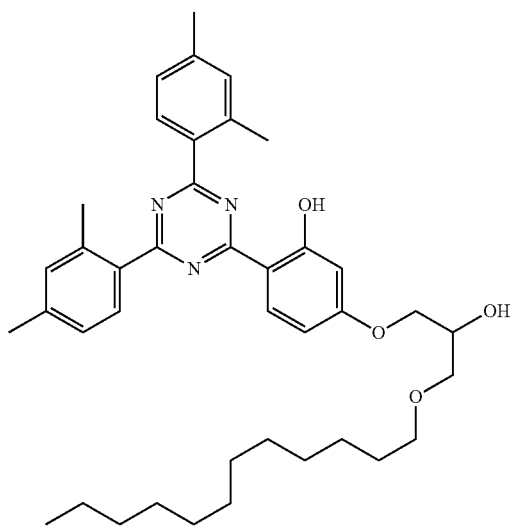 [SMILES: CCCCCCCCCCCCOCC(O)COc1ccc(-c2nc(-c3ccc(C)cc3C)nc(-c3ccc(C)cc3C)n2)c(O)c1]

TABLE C-continued

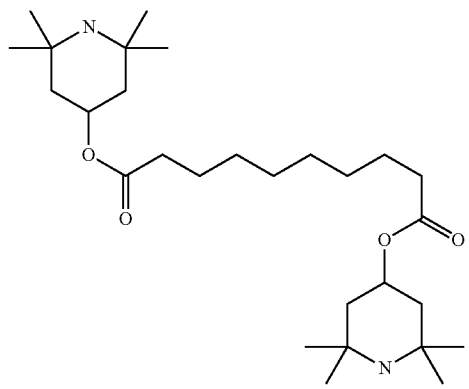

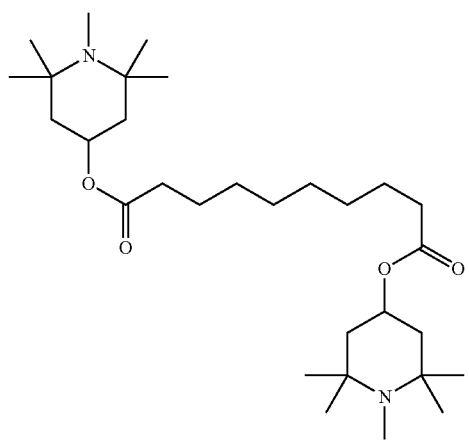

The following table shows reactive mesogens that can be added to the LC media according to the present invention.

TABLE D

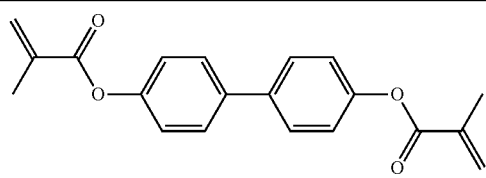

RM-1

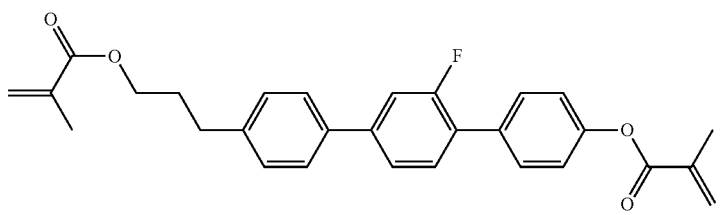

RM-2

Above and below, percentages are percent by weight. All temperatures are given in degrees Celsius. m.p. denotes melting point, cl.p.=clearing point. Furthermore, C=crystal state, N=nematic phase, S=smectic phase and I=isotropic phase. The data between these symbols represent the transition temperatures. The optical data are measured at 20° C., unless expressly stated otherwise.

All physical properties have been and are determined according to "Merck Liquid Crystals, Physical Properties of Liquid Crystals", Status November 1997, Merck KGaA, Germany and are given for a temperature of 20° C., unless explicitly stated otherwise.

For the present invention, the term "threshold voltage" relates to the capacitive threshold ($V_0$), also known as the Freedericks threshold, unless explicitly indicated otherwise.

The term threshold voltage refers in the instant application to the optical threshold and is given for 10% relative contrast ($V_{10}$) and the term saturation voltage refers to the optical saturation and is given for 90% relative contrast ($V_{90}$) both, if not explicitly stated otherwise. The capacitive threshold voltage ($V_0$), also called Freedericks-threshold ($V_{Fr}$) is only used if explicitly mentioned.

The ranges of parameters given in this application are all including the limiting values, unless explicitly stated otherwise.

Throughout this application, unless explicitly stated otherwise, all concentrations are given in mass percent and relate to the respective complete mixture, all temperatures are given in degrees centigrade (Celsius) and all differences of temperatures in degrees centigrade. The optical anisotropy ($\Delta n$) is determined at a wavelength of 589.3 nm. The dielectric anisotropy ($\Delta \epsilon$) is determined at a frequency of 1 kHz. The threshold voltages, as well as all other electro-optical properties are been determined with test cells prepared at Merck KGaA, Germany. The test cells for the determination of $\Delta \epsilon$ have a cell gap of approximately 20 µm. The electrode is a circular ITO electrode with an area of 1.13 cm$^2$ and a guard ring. The orientation layers are JALS 2096-R1 from JSR (Japan Synthetic Rubber), Japan for homeotropic orientation ($\epsilon_\parallel$) and polyimide AL-1054 also from JSR for planar homogeneous orientation ($\epsilon_\perp$). The capacities are determined with a frequency response analyser Solatron 1260 using a sine wave with a voltage of 0.3 $V_{rms}$. The electro-optical data are determined in a VA cell. These test cells used have a cell gap selected to have an optical retardation (d·$\Delta n$) matching the first transmission minimum according to Gooch and Tarry at an optical retardation (d·$\Delta n$) of 0.5 µm at 20° C., unless expressly stated otherwise.

The light used in the electro-optical measurements is white light. The set up used is an equipment commercially available from Autronic Melchers, Karlsruhe, Germany. The characteristic voltages are determined under perpendicular observation. The threshold ($V_{10}$)—mid grey ($V_{50}$)—and saturation ($V_{90}$) voltages are been determined for 10%, 50% and 90% relative contrast, respectively.

The response times are given as rise time ($\tau_{on}$) for the time for the change of the relative contrast from 0% to 90% ($t_{90}-t_0$), i.e. including the delay time ($t_{10}-t_0$), as decay time ($\tau_{off}$) for the time for the change of the relative contrast from 100% back to 10% ($t_{100}-t_{10}$) and as the total response time ($\tau_{total}=\tau_{on}+\tau_{off}$), respectively.

The voltage holding ratio is determined in test cells produced at Merck Japan Ltd. The measurement cells have alkaline free glass substrates and are constructed with polyimide alignment layers (SE7492 from NISSAN CHEMICAL INDUSTRIES$^{LTD}$) with a layer thickness of 50 nm, which have been rubbed perpendicular to one another. The layer thickness is uniformly 6.0 µm. The surface area of the transparent electrodes of ITO is 1 cm×1 cm.

The voltage holding ratio is determined after 30 minutes in the oven at 70° C. ($HR_{70}$). The voltage used has a frequency of 60 Hz.

The rotational viscosity is determined using the transient current method and the flow viscosity in a modified Ubbelohde viscometer. For liquid-crystal mixtures ZLI-2293, ZLI-4792 and MLC-6608, all products from Merck KGaA, Darmstadt, Germany, the rotational viscosity values determined at 20° C. are 161 mPa·s, 133 mPa·s and 186 mPa·s respectively, and the flow viscosity values (ν) are 21 mm$^2$·s$^{-1}$, 14 mm$^2$·s$^{-1}$ and 27 mm$^2$·s$^{-1}$ respectively.

Then the liquid crystal mixtures are stabilized by in situ polymerisation of a polymer precursor, preferably of a reactive mesogen. To this end the respective mixture is introduced into a respective test cell and the reactive compound is polymerized via UV-irradiation from a high-pressure mercury lamp. The energy of the UV exposure is 6 J. A wide-band-pass filter (300 nm≤λ≤400 nm) together with soda-lime glass are applied, which decreases intensity of the UV radiation at shorter wavelengths. During an electrical field is applied. A rectangular wave electric voltage (14 $V_{PP}$) is applied to the cells.

The following symbols are used in the present application:

$V_0$ threshold voltage, capacitive [V] at 20° C.,
$n_e$ extraordinary refractive index measured at 20° C. and 589 nm,
$n_o$ ordinary refractive index measured at 20° C. and 589 nm,
$\Delta n$ optical anisotropy ($\Delta n = n_e - n_o$),
$\epsilon_\perp$ dielectric susceptibility perpendicular to the director at 20° C. and 1 kHz,
$\epsilon_\parallel$ dielectric susceptibility parallel to the director at 20° C. and 1 kHz,
$\Delta \epsilon$ dielectric anisotropy at 20° C. and 1 kHz, ($\Delta \epsilon = \epsilon_\parallel - \epsilon_\perp$),
ν flow viscosity measured at 20° C. [mm$^2$·s$^{-1}$],
$\gamma_1$ rotational viscosity measured at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN],
LTS low-temperature stability (phase stability) determined in test cells,
$V_0$ capacitive threshold voltage also called Freedericks threshold voltage,
$V_{10}$ threshold voltage, i.e. voltage for 10% relative contrast
$V_{50}$ mid-grey voltage, i.e. voltage for 50% relative contrast and
$V_{90}$ saturation voltage, i.e. voltage for 90% relative contrast ($V_{10}$, $V_{50}$ and $V_{90}$ all for a viewing angle perpendicular to the plate surface).

The following examples explain the present invention without limiting it.

EXAMPLE 1

| Mixture M1: | |
|---|---|
| Composition Compound | |
| No. | Abbreviation |
| 1 | CY-3-O2 |
| 2 | CY-3-O4 |
| 3 | CCY-3-O2 |
| 4 | CPY-2-O2 |
| 5 | CPY-3-O2 |

| Mixture M1: | |
|---|---|
| 6 | PYP-2-3 |
| 7 | CC-2-3 |
| 8 | CP-3-O1 |
| 9 | CCP-3-1 |
| Physical Properties | |
| T(N, I) = | 74.3° C. |
| $n_e$ (20° C., 589.3 nm) = | 1.6053 |
| $\Delta n$ (20° C., 589.3 nm) = | 0.1150 |
| $\varepsilon_\perp$ (20° C., 1 kHz) = | 6.5 |
| $\Delta\varepsilon$ (20° C., 1 kHz) = | −3.0 |
| $k_1$(20° C.) = | 12.1 pN |
| $k_3$(20° C.) = | 15.0 pN |
| $\gamma_1$ (20° C.) = | 119 mPa · s |
| $V_0$ (20° C.) = | 2.37 V |

This mixture is prepared and investigated. Subsequently 0.20% alternatively of one each of the two reactive compounds RM-1

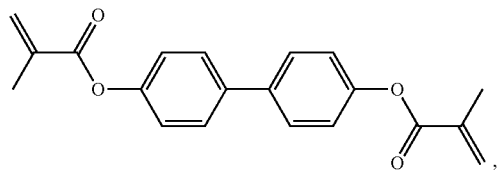 [SMILES: C=C(C)C(=O)Oc1ccc(-c2ccc(OC(=O)C(=C)C)cc2)cc1]

and RM-2

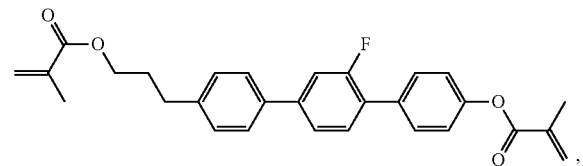 [SMILES: C=C(C)C(=O)OCCCc1ccc(-c2ccc(-c3ccc(OC(=O)C(=C)C)cc3)c(F)c2)cc1]

respectively, is added to the mixture. Then the mixture is introduced into a respective test cell and the reactive compound is polymerized via UV-irradiation from a high-pressure Hg lamp. The energy of the UV exposure is 6 J. A wide-band-pass filter (300 nm≤λ≤400 nm) together with soda-lime glass are applied, which decreases intensity of the UV radiation at shorter wavelengths. During exposure a rectangular electric voltage (14 $V_{PP}$) is applied to the cells.

EXAMPLE 2

| Mixture M2: | |
|---|---|
| Composition Compound | |
| No. | Abbreviation |
| 1 | CY-3-O2 |
| 2 | CY-3-O4 |
| 3 | CCY-3-O2 |
| 4 | CPY-2-O2 |
| 5 | CPY-3-O2 |
| 6 | PYP-2-3 |
| 7 | PYP-2-4 |
| 8 | CC-2-3 |
| 9 | CP-3-O1 |
| 10 | CCP-3-1 |
| Physical Properties | |
| T(N, I) = | 70.5° C. |
| $n_e$ (20° C., 589.3 nm) = | 1.6057 |
| $\Delta n$ (20° C., 589.3 nm) = | 0.1150 |
| $\varepsilon_\perp$ (20° C., 1 kHz) = | 6.1 |
| $\Delta\varepsilon$ (20° C., 1 kHz) = | −2.7 |
| $k_1$(20° C.) = | 11.3 pN |
| $k_3$(20° C.) = | 14.0 pN |
| $\gamma_1$ (20° C.) = | 109 mPa · s |
| $V_0$ (20° C.) = | 2.41 V |

This mixture is prepared and investigated. Subsequently 0.30% alternatively of one each of the two reactive compounds RM-1 and RM-2, respectively, is added to the mixture. Then the mixture is introduced into a respective test cell and the reactive compound is polymerized via UV-initiation as described under example 1.

EXAMPLE 3

| Mixture M3: | | |
|---|---|---|
| Composition Compound | | |
| No. | Abbreviation | c/% |
| 1 | CY-3-O2 | 15.0 |
| 2 | CY-5-O2 | 5.0 |
| 3 | CCY-3-O2 | 11.0 |
| 4 | CPY-2-O2 | 5.5 |
| 5 | CPY-3-O2 | 10.5 |
| 6 | PYP-2-3 | 13.5 |
| 7 | CC-3-V | 30.0 |
| 8 | CC-3-V1 | 9.5 |
| Σ | | 100.0 |
| Physical Properties | | |
| T(N, I) = | 74.7° C. | |
| $n_e$ (20° C., 589.3 nm) = | 1.5925 | |
| $\Delta n$ (20° C., 589.3 nm) = | 0.1082 | |
| $\varepsilon_\perp$ (20° C., 1 kHz) = | 6.5 | |
| $\Delta\varepsilon$ (20° C., 1 kHz) = | −3.0 | |
| $k_1$(20° C.) = | 12.7 pN | |
| $k_3$(20° C.) = | 15.6 pN | |
| $\gamma_1$ (20° C.) = | 94 mPa · s | |
| $V_0$ (20° C.) = | 2.37 V | |

This mixture is prepared and investigated. Subsequently 0.30% alternatively of one each of the two reactive compounds RM-1 and RM-2, respectively, is added to the mixture. Then the mixture is introduced into a respective test cell and the reactive compound is polymerized via UV-initiation as described under example 1.

The invention claimed is:
1. A liquid crystal medium having a negative dielectric anisotropy $\Delta\varepsilon$ having the composition A) or B),
  A) consisting of:
    8 to 12% of a compound of the formula Ia,
    3 to 7% of a compound of the formula Ib,
    10 to 14% of a compound of the formula IIa,
    5 to 9% of a compound of the formula IIIa,
    9 to 12% of a compound of the formula IIIb,
    12 to 16% of a compound of the formula IVa,

16 to 21% of a compound of the formula Va,
15 to 19% of a compound of the formula VIa
4 to 8% of a compound of the formula VIIa,
optionally one or more reactive mesogen compounds, and
optionally one or more additives selected from the group consisting of pleochroic dyes, UV stabilizers, antioxidants, chiral dopants, polymerization initiators, microparticles and nanoparticles, or B) consisting of:
6 to 8% of a compound of the formula Ia,
3 to 7% of a compound of the formula Ib,
10 to 14% of a compound of the formula IIa,
2 to 6% of a compound of the formula IIIa,
9 to 12% of a compound of the formula IIIb,
12 to 16% of a compound of the formula IVa,
2 to 6% of a compound of the formula IVb,
18 to 24% of a compound of the formula Va,
13 to 17% of a compound of the formula VIa,
2 to 5% of a compound of the formula VIIa,
optionally one or more reactive mesogen compounds, and
optionally one or more additives selected from the group consisting of pleochroic dyes, UV stabilizers, antioxidants, chiral dopants, polymerization initiators, microparticles and nanoparticles, Ia
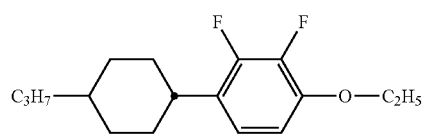

Ib
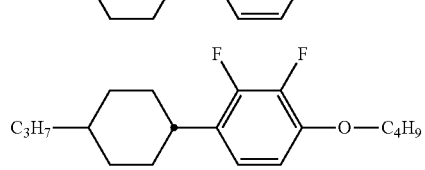

IIa
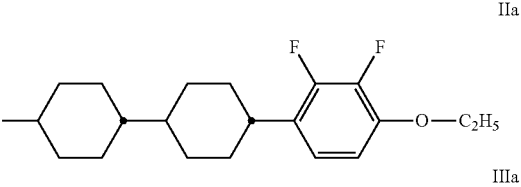

IIIa
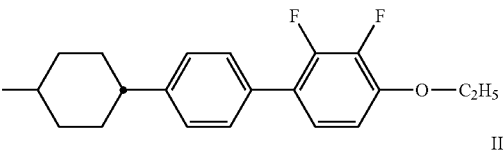

IIIb
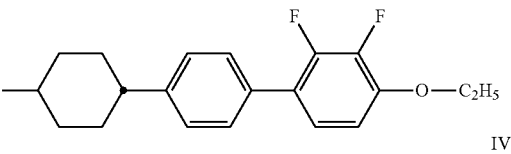

IVa
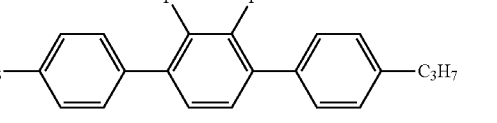

IVb

Va

VIa

VIIa

2. The liquid crystal medium according to claim 1, which has composition A).

3. The liquid crystal medium according to claim 1, which has composition B).

4. The liquid crystal medium according to claim 1, which has composition A) or B) and contains one or more additives selected from the group consisting of pleochroic dyes, UV stabilizers, antioxidants, chiral dopants, polymerization initiators, microparticles and nanoparticles.

5. An electro-optical liquid crystal display containing the liquid crystal medium according to claim 1.

6. A liquid crystal panel comprising the liquid crystal medium according to claim 1 sandwiched by a pair of substrates; and electrodes for applying an electric field to the liquid crystal medium parallel to the surfaces of the substrate, the liquid crystal medium being vertically aligned with respect to the surfaces of the substrates at the time when no electric field is applied.

7. A TV-set comprising the liquid crystal panel according to claim 6.

8. A 3D-TV-set according to claim 7.

9. The liquid crystal medium according to claim 1, which has composition A) or B) and contains one or more reactive mesogen compounds.

10. The liquid crystal medium according to claim 1, which has composition A) or B) and contains a reactive mesogen compound which is of formula RM-1

RM-1

11. The liquid crystal medium according to claim 1, which has composition A) or B) and contains a reactive mesogen compound which is of formula RM-2

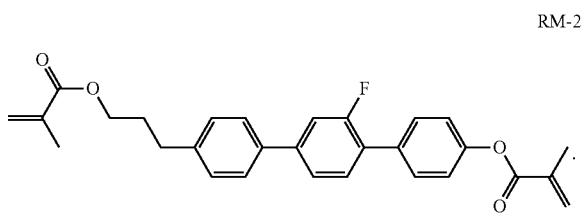 [SMILES: C=C(C)C(=O)OCCCc1ccc(-c2ccc(-c3ccc(OC(=O)C(=C)C)cc3)c(F)c2)cc1]

RM-2

12. The liquid crystal medium according to claim 1, which has composition A) or B) and contains reactive mesogen compounds of both formula RM-1 and formula RM-2

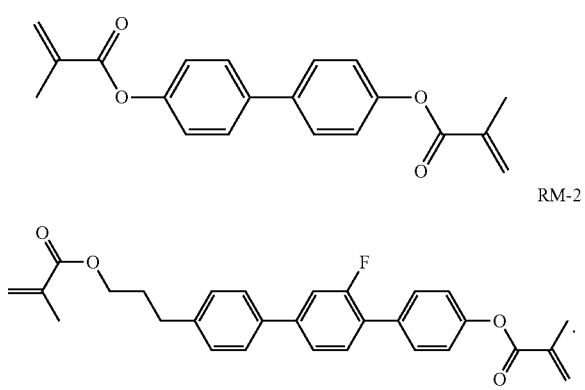

RM-1

RM-2

13. A stabilized liquid crystal medium obtained by polymerization of the liquid crystal medium of claim 9 containing a reactive mesogen compound.

14. A stabilized liquid crystal medium obtained by polymerization of the liquid crystal medium of claim 10 containing a reactive mesogen compound.

15. A stabilized liquid crystal medium obtained by polymerization of the liquid crystal medium of claim 11 containing a reactive mesogen compound.

16. A stabilized liquid crystal medium obtained by polymerization of the liquid crystal medium of claim 12 containing a reactive mesogen compound.

17. A method of stabilizing the liquid crystal medium according to claim 9 by polymerizing the one or more reactive mesogen compounds.

18. A method of stabilizing the liquid crystal medium according to claim 10 by polymerizing the reactive mesogen compound.

19. A method of stabilizing the liquid crystal medium according to claim 11 by polymerizing the reactive mesogen compound.

20. A method of stabilizing the liquid crystal medium according to claim 12 by polymerizing the reactive mesogen compounds.

21. The liquid crystal medium according to claim 2, which contains one or more reactive mesogen compounds.

22. The liquid crystal medium according to claim 2, which contains a reactive mesogen compound of formula RM-1 or of formula RM-2 or of both formula RM-1 and formula RM-2

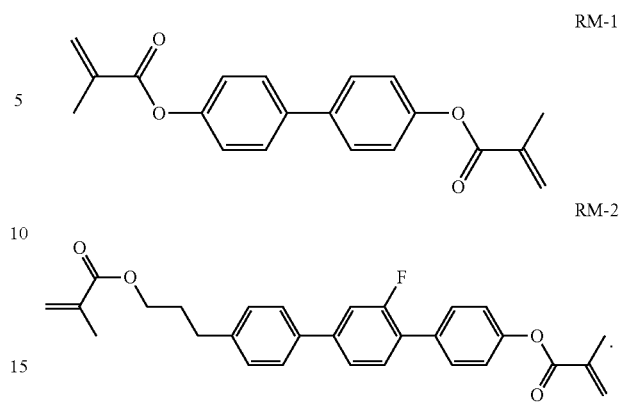

RM-1

RM-2

23. A stabilized liquid crystal medium obtained by polymerization of the liquid crystal medium of claim 22 containing a reactive mesogen compound.

24. A liquid crystal panel comprising the liquid crystal medium according to claim 2, sandwiched by a pair of substrates; and electrodes for applying an electric field to the liquid crystal medium parallel to the surfaces of the substrate, the liquid crystal medium being vertically aligned with respect to the surfaces of the substrates at the time when no electric field is applied.

25. The liquid crystal medium according to claim 3, which contains one or more reactive mesogen compounds.

26. The liquid crystal medium according to claim 3, which contains a reactive mesogen compound of formula RM-1 or of formula RM-2 or of both formula RM-1 and formula RM-2

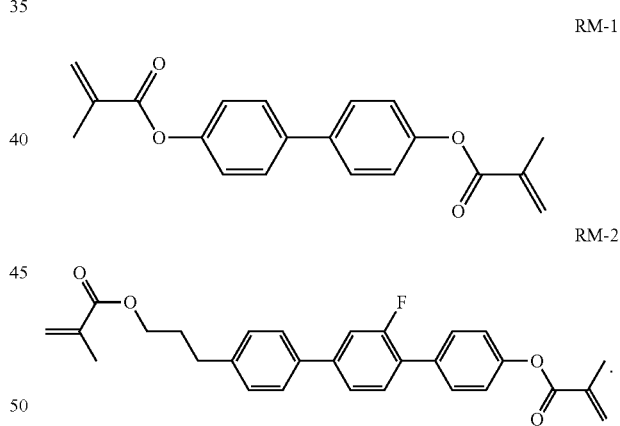

RM-1

RM-2

27. A stabilized liquid crystal medium obtained by polymerization of the liquid crystal medium of claim 26 containing a reactive mesogen compound.

28. A liquid crystal panel comprising the liquid crystal medium according to claim 3, sandwiched by a pair of substrates; and electrodes for applying an electric field to the liquid crystal medium parallel to the surfaces of the substrate, the liquid crystal medium being vertically aligned with respect to the surfaces of the substrates at the time when no electric field is applied.

29. The liquid crystal medium according to claim 1, which exhibits rotational viscosity ($\gamma_1$) measured at 20° C. of from 94-119 mPa·s, birefringence ($\Delta n$) of from 0.1082 to 0.1150 and dielectric anisotropy ($\Delta\epsilon$) at 20° C. and 1 kHz of from −2.7 to −3.0.

30. A liquid crystal medium having a negative dielectric anisotropy Δ∈ having the composition M3), consisting of:

15% of a compound of the formula Ia,
5% of a compound of the formula Ic,
11% of a compound of the formula IIa,
5.5% of a compound of the formula IIIa,
10.5% of a compound of the formula IIIb,
13.5% of a compound of the formula IVa,
30% of a compound of the formula Vb,
9.5% of a compound of the formula Vc,
optionally one or more reactive mesogen compounds, and
optionally one or more additives selected from the group consisting of pleochroic dyes, UV stabilizers, antioxidants, chiral dopants, polymerization initiators, microparticles and nanoparticles,

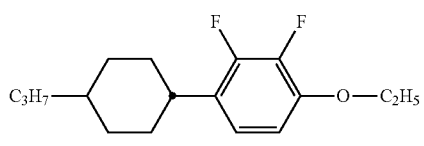

Ia

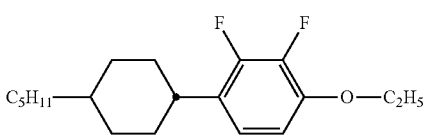

Ic

IIa

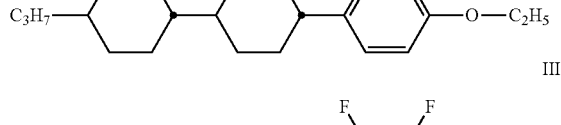

IIIa

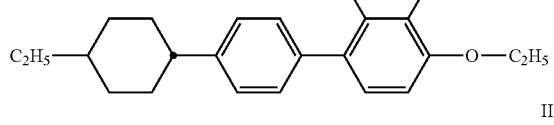

IIIb

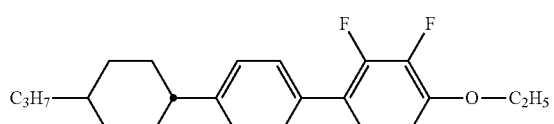

IVa

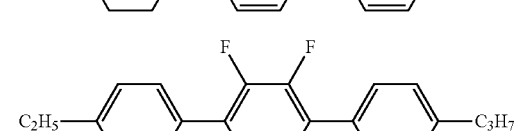

Vb

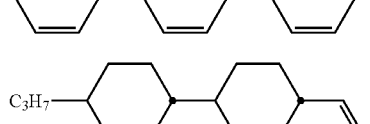

Vc

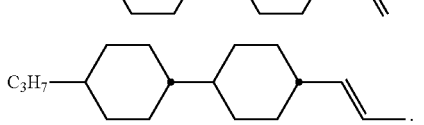

31. The liquid crystal medium according to claim 30, which contains one or more reactive mesogen compounds.

32. The liquid crystal medium according to claim 30, which further contains a reactive mesogen compound of formula RM-1 or of formula RM-2 or of both formula RM-1 and formula RM-2

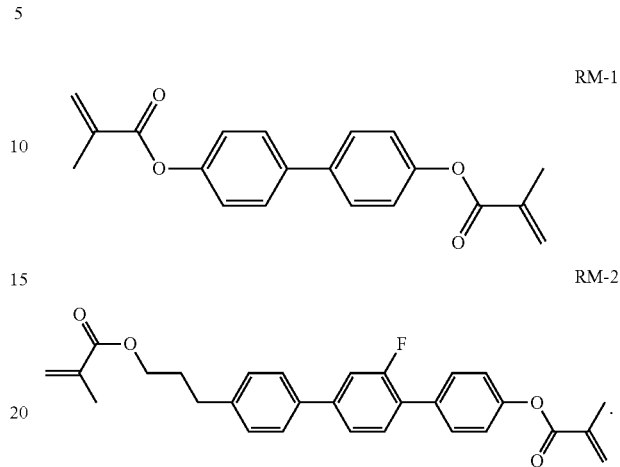

RM-1

RM-2

33. A liquid crystal medium having a negative dielectric anisotropy, Δ∈, which comprises at least one compound of each of:

formula Ia

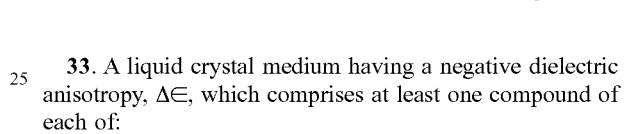

Ia formula Ib

Ib formula IIa

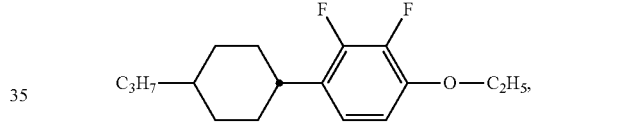

IIa formula IIIa

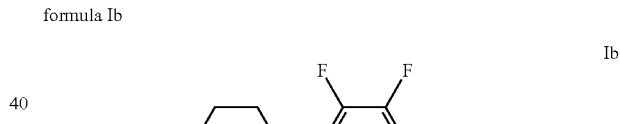

IIIa formula IIIb

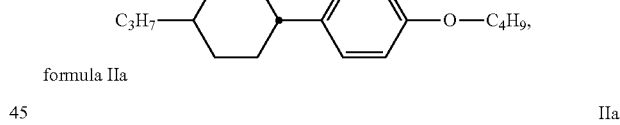

IIIb

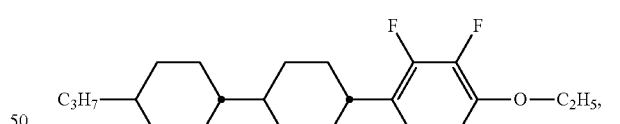

-continued formula IVa

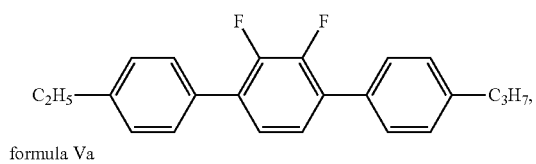

formula Va

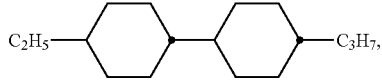

formula VIa

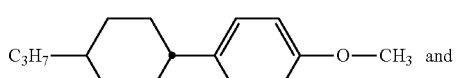

formula VIIa

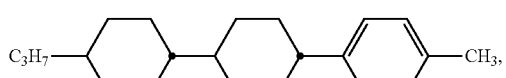

and optionally one or more reactive mesogen compounds, and optionally one or more additives selected from the group consisting of pleochroic dyes, UV stabilizers, antioxidants, chiral dopants, polymerization initiators, microparticles and nanoparticles, wherein:

the amount of compounds of formula Ia and Ib combined in the medium is 9 to 24% by weight, the amount of compounds of formula IIa in the medium is 9 to 14% by weight, the amount of compounds of formula IIIa and IIIb combined in the medium is 11 to 21% by weight, the amount of compounds of formula IVa in the medium is 10 to 22% by weight, the amount of compounds of formula Va in the medium is 16 to 22% by weight, the amount of compounds of formula VIa in the medium is no more than 19% by weight, the amount of compounds of formula VIIa in the medium is no more than 8% by weight.

34. A liquid crystal medium having a negative dielectric anisotropy, $\Delta\epsilon$, which comprises at least one compound of each of:

formula Ia

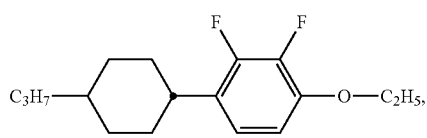

formula Ib

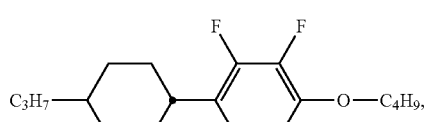

formula IIa

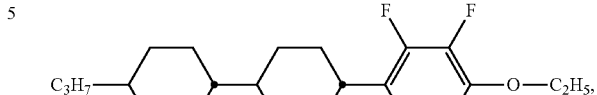

formula IIIa

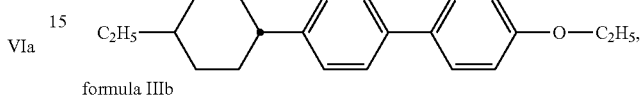

formula IIIb

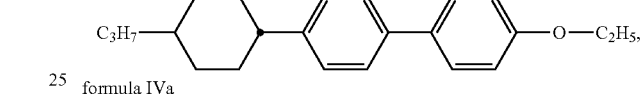

formula IVa

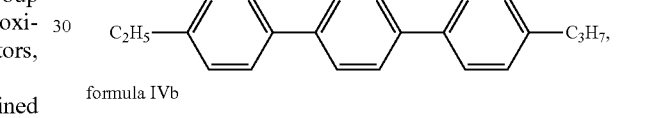

formula IVb

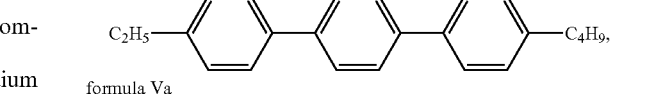

formula Va

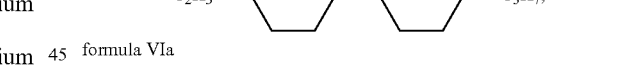

formula VIa

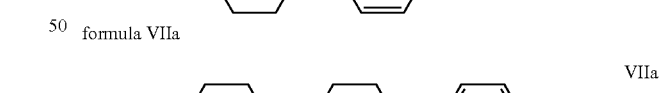

formula VIIa

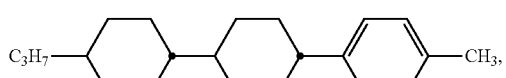

and optionally one or more reactive mesogen compounds, and optionally one or more additives selected from the group consisting of pleochroic dyes, UV stabilizers, antioxidants, chiral dopants, polymerization initiators, microparticles and nanoparticles, wherein:

the amount of compounds of formula Ia and Ib combined in the medium is 9 to 24% by weight, the amount of compounds of formula IIa in the medium is 9 to 14% by weight, the amount of compounds of formula IIIa and IIIb combined in the medium is 11 to 21% by weight,
the amount of compounds of formula IVa and IVb combined in the medium is 10 to 22% by weight,
the amount of compounds of formula Va in the medium is 16 to 22% by weight,
the amount of compounds of formula VIa in the medium is no more than 19% by weight,
the amount of compounds of formula VIIa in the medium is no more than 8% by weight.

* * * * *